P. EBELING.
APPARATUS FOR THE MANUFACTURE OF PRISM PENDANTS.
APPLICATION FILED FEB. 14, 1918.

1,297,122.

Patented Mar. 11, 1919.
2 SHEETS—SHEET 1.

INVENTOR.
Phillip Ebeling
BY
ATTORNEY.

P. EBELING.
APPARATUS FOR THE MANUFACTURE OF PRISM PENDANTS.
APPLICATION FILED FEB. 14, 1918.
1,297,122.
Patented Mar. 11, 1919.
2 SHEETS—SHEET 2.
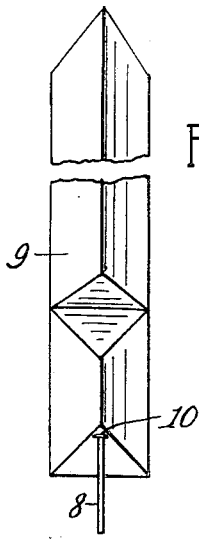
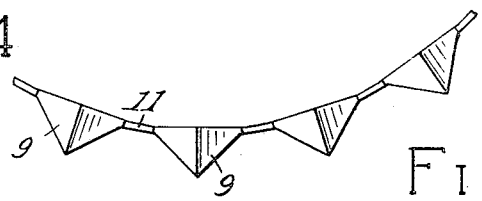
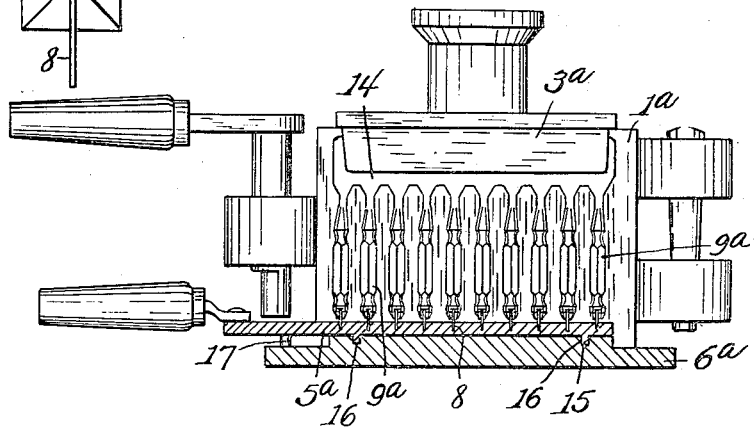
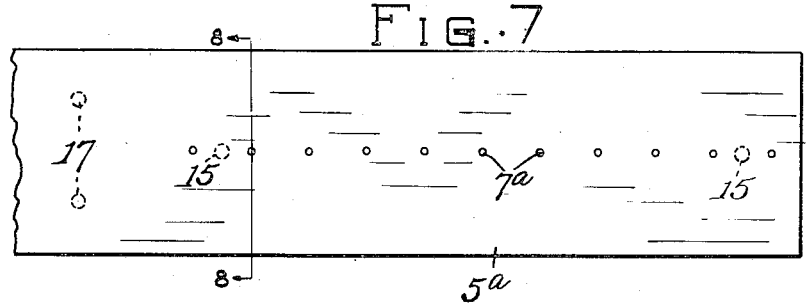
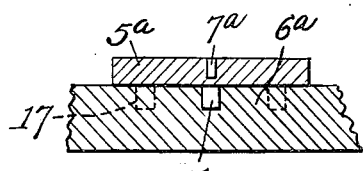
INVENTOR.
Phillip Ebeling
BY
N. E. Dunlap
ATTORNEY.

UNITED STATES PATENT OFFICE.

PHILLIP EBELING, OF MOUNDSVILLE, WEST VIRGINIA, ASSIGNOR TO FOSTORIA GLASS COMPANY, OF MOUNDSVILLE, WEST VIRGINIA, A CORPORATION OF WEST VIRGINIA.

APPARATUS FOR THE MANUFACTURE OF PRISM-PENDANTS.

1,297,122.   Specification of Letters Patent.   Patented Mar. 11, 1919.

Application filed February 14 1918. Serial No. 217,278.

*To all whom it may concern:*

Be it known that I, PHILLIP EBELING, a citizen of the United States of America, and resident of Moundsville, county of Marshall, and State of West Virginia, have invented certain new and useful Improvements in Apparatus for the Manufacture of Prism-Pendants, of which the following is a specification.

This invention relates broadly to glass molds, and more particularly to apparatus for manufacturing prism pendants of the type commonly employed in chandeliers and the like.

The primary object of the invention is to provide improved mechanism for the production of prism pendants in an economical and expeditious manner.

A further object is to provide means whereby a pin or wire adapted to be shaped to form an attaching hook or link may be rigidly attached to a glass pendant during the course of manufacture of the latter, thus obviating the heretofore universal practice of drilling a hole or holes in the pendant for the reception of an attaching hook or link.

With these and other objects in view, the invention resides in the features of construction, arrangement of parts and combinations of elements which will hereinafter be exemplified, reference being had to the accompanying drawings, forming a part of this specification, in which—

Fig. 4 is an enlarged front elevation of a formed pendant;

Fig. 5 is a top plan view of a series of pendants in the connected form in which they come from the mold shown in Figs. 1 and 2;

Fig. 6 is a view similar to Fig. 1, showing a modified form of mold;

Fig. 7 is an enlarged partial top plan view of the pin-supporting bar employed in the mold depicted in Fig. 6; and—

Fig. 8 is a section of said bar, taken on line 8—8, Fig. 7, and of an underlying portion of the mold base.

Referring to said drawings, in which like designating characters distinguish like parts throughout the several views—

Figure 2:
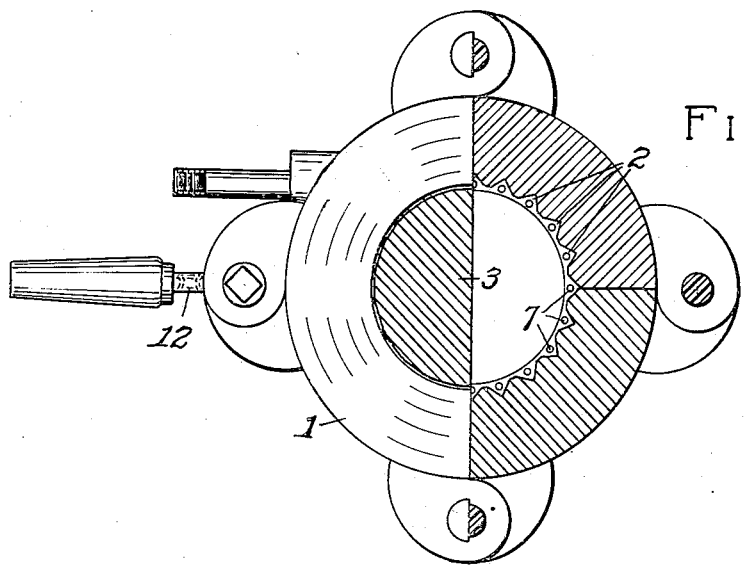
Fig. 2 is a section of the same on line 2—2, Fig. 1.
Figure 1:
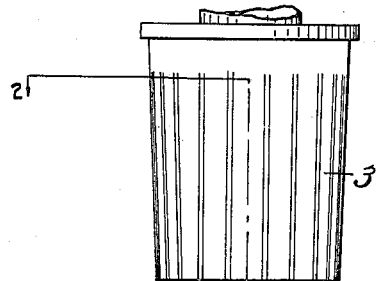
Figure 1 is a partial central vertical section of a preferred form of the invention.
Figure 3:
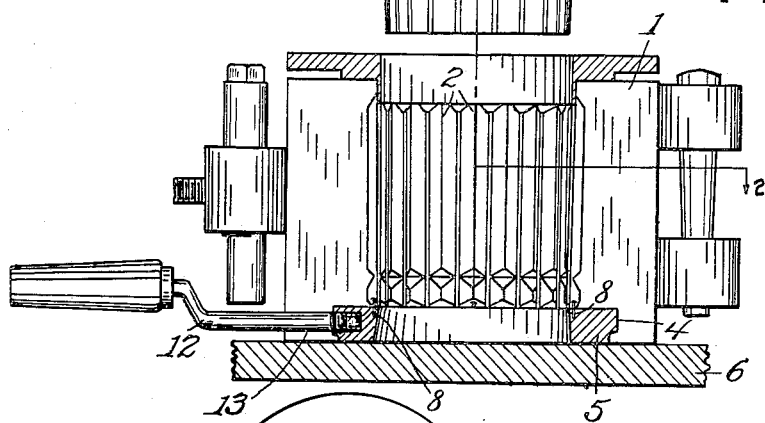
Fig. 3 is a top plan view of the pin-supporting ring.
Figure 3:
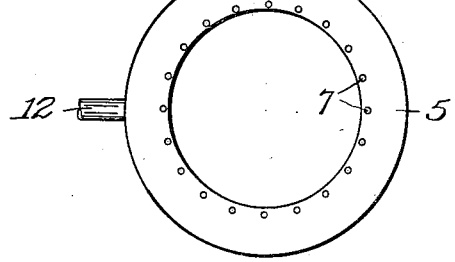

1 indicates a glass press mold of the four-part circular type which has formed in the walls thereof substantially parallel closely-juxtaposed recesses or molding spaces 2, each of the size and form of the pendants to be formed, and coöperating with said mold is a plunger 3 by means of which glass introduced within the mold is displaced to fill said molding spaces.

The various mold sections are interiorly recessed adjacent to their lower ends to form an internal annular channel 4 when the mold is closed, said channel being designed to receive therein the correspondingly-shaped outer edge of a metal pin-carrying member or ring 5 of circular form which rests upon the mold-base 6 and about which said mold sections are closable. Provided in the upper face of said ring 5 is a circular row of sockets 7 located at properly spaced intervals so that one thereof is located in alinement with and in a substantially central position with respect to each of said molding spaces 2. Each socket 7 is designed to loosely receive therein the body portion of a wire or pin 8 and to support the latter with a suitable length of its upper end projecting or protruding into the lower end of the adjacent molding space 2.

In practice, the ring 5 with pins 8 mounted in the sockets 7 thereof is mounted upon the base 6 and the mold sections are swung into closed embracing relation thereto. Then, having introduced a charge of plastic glass within the mold, the plunger 3 is lowered and the glass is thereby forced into the molding spaces 2 for forming the pendants 9. The glass so forced into said spaces is compressed about the protruding upper ends of said pins, each of which is preferably provided with a suitable form of locking terminal, as the head 10, whereby the embedded portion of the pin is effectually held.

Adjacent molding spaces 2 are disposed in connected relation so that adjacent pendants formed therein are united at their lateral edges by a thin frangible web 11 which is subsequently broken to separate said pendants. The rough or uneven edge produced by the fracture along said web is subsequently removed by grinding.

The ring 5 has attached thereto a handle, as 12, which projects outward from the mold, said handle being received in grooves or channels 13 provided therefor in the abutting faces of the mold sections at the front of the mold.

Fig. 6 illustrates a modification in which a two-part mold 1ª having substantially parallel sides is employed, said mold being designed for forming pendants 9ª in an alined row in which they have their upper ends integral with a surplus glass body 14 located in the upper part of the mold and directly beneath the plunger 3ª. In this form of mold I employ a straight pin-supporting bar 5ª which is insertible in and removable from the mold, the same being adapted for mounting upon a mold base 6ª and having downwardly directed studs 15 receivable in positioning sockets 16 provided in said base. Said bar 5ª has therein a row of alined pin-receiving sockets 7ª in which the pins or wires 8 are mounted, said sockets being spaced to occupy positions in centrally alined relation to the pendant-molding spaces of the mold. Tipping or overturning of the bar 5ª is prevented by a pair of foot members 17 disposed in transverse alinement and adapted to seat upon a suitable part of the mold base 6ª, as shown.

After being annealed, the pendants 9ª are cracked off the surplus glass body 14 at their upper ends, which ends are then ground down to the shape desired.

As is obvious, the unembedded portion of the pin or wire 8 may be shaped to form a hook, loop, link or other suitable attaching device whereby the pendant may be suspended.

What is claimed is—

1. In apparatus for forming prism pendants, a base, a sectional press mold mounted on said base, said mold having pendant-molding spaces formed in the interior walls thereof and having an internal annular channel in its extreme lower end in open communication with said molding spaces, a metal ring removably mounted on said base, said mold sections being laterally movable into and out of embracing relation to said ring, in which relation said ring is seated in said channel, said ring having sockets in its upper face, said sockets being adapted for receiving pins in seated position therein and being arranged to correspond with the disposition of said molding spaces, said rings carrying means thereon whereby it may be supported by hand during introduction and removal and whereby, when the mold is closed over said ring, the latter is accurately positioned with such pins in centrally alined relation to said molding spaces.

2. In apparatus for forming prism pendants, a base, a press mold seated on said base, said mold being composed of hinged sections having a plurality of pendant molding spaces formed in the interior walls thereof, said spaces being disposed in communicating relation whereby the pendants formed therein are connected laterally by frangible webs, said mold sections being recessed adjacent to the lower ends of said molding spaces, a member removably seated upon said base and receivable within said recesses, said mold sections being laterally movable into and out of embracing relation to said member, said member having therein a row of shallow sockets spaced to correspond with the relative spacing of said molding spaces, and a handle carried by said member adapted to protrude between the mold sections at the front of the mold when the latter is closed for accurately positioning said sockets in the lower ends of said molding spaces, said sockets being adapted to support therein pins in positions wherein the upper ends of the latter will be embedded in the pendants formed in said spaces.

3. In apparatus for forming prism pendants, a base, a circular press mold mounted on said base, said mold being composed of hinged sections having a plurality of pendant molding spaces formed in the interior walls thereof, said spaces being disposed in communicating relation whereby the pendants formed therein are connected in the form of a hollow cylinder with frangible webs intermediate the pendants, said mold sections being recessed interiorly to form a continuous circular recess when said sections occupy closed positions and having the lower ends of said molding spaces opening into said recess, and a pin-supporting and positioning ring removably seated upon said base and adapted to be partially received within said recess when the mold is closed, said ring having the inner projecting edge thereof serving as a base upon which the pendants terminate at their lower ends, and having in the upper face of said projecting edge a plurality of pin-carrying sockets of less depth than the thickness of said ring and in which the pins are mounted prior to the introduction of the ring within the mold, said sockets being arranged to lie in axial alinement with said molding spaces.

In testimony whereof, I affix my signature in presence of two subscribing witnesses.

PHILLIP EBELING.

Witnesses:
 EUGENE STAHL,
 CARL REGEL.